E. P. LINDAHL.
BOTTLE FILLER.
APPLICATION FILED APR. 25, 1911.

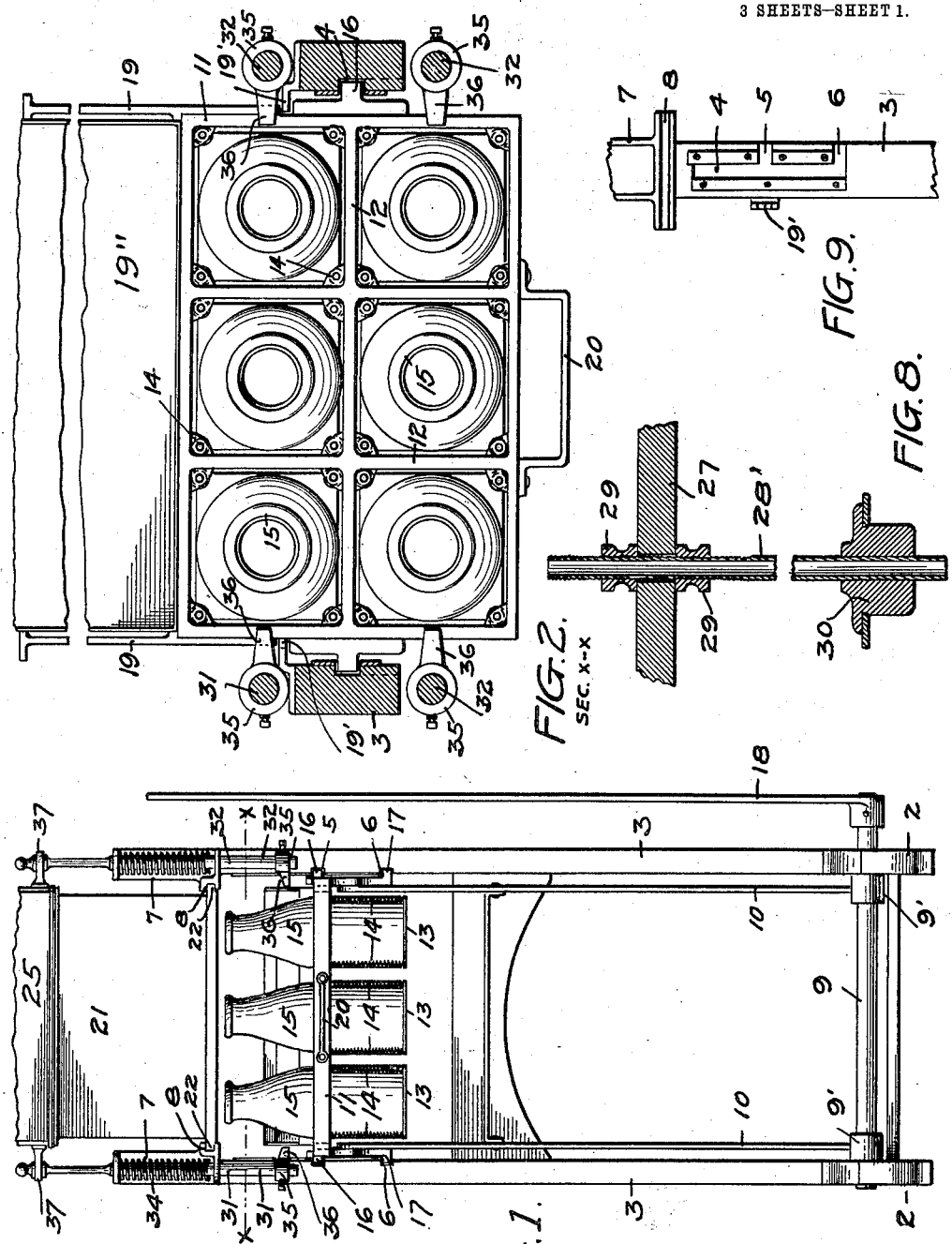
E. P. LINDAHL.
BOTTLE FILLER.
APPLICATION FILED APR. 25, 1911.
1,032,687.
Patented July 16, 1912.
3 SHEETS—SHEET 1.
INVENTOR
ERICK P. LINDAHL
BY
HIS ATTORNEYS

1,032,687.

Patented July 16, 1912.
3 SHEETS—SHEET 2.

WITNESSES

INVENTOR
ERICK P. LINDAHL
BY
HIS ATTORNEYS

E. P. LINDAHL.
BOTTLE FILLER.
APPLICATION FILED APR. 25, 1911.
1,032,687.
Patented July 16, 1912.
3 SHEETS—SHEET 3.
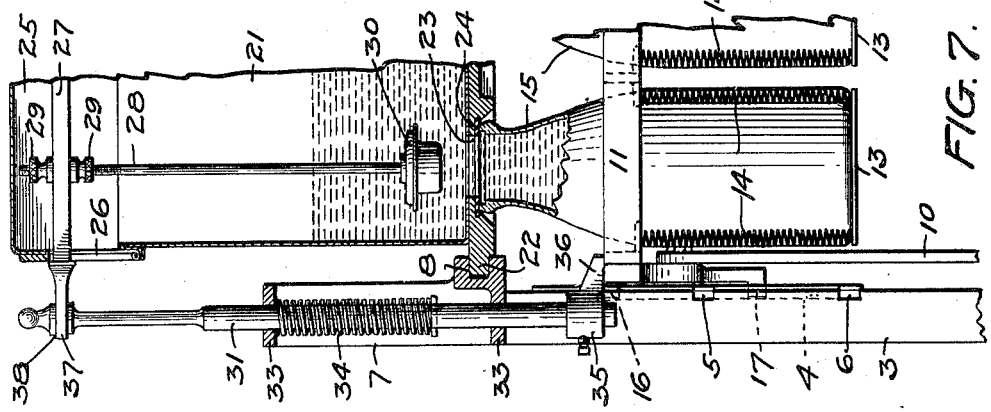
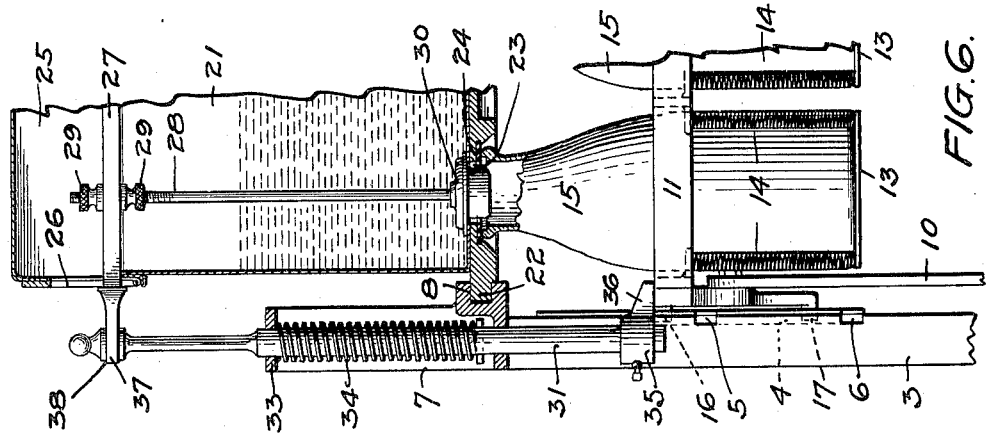
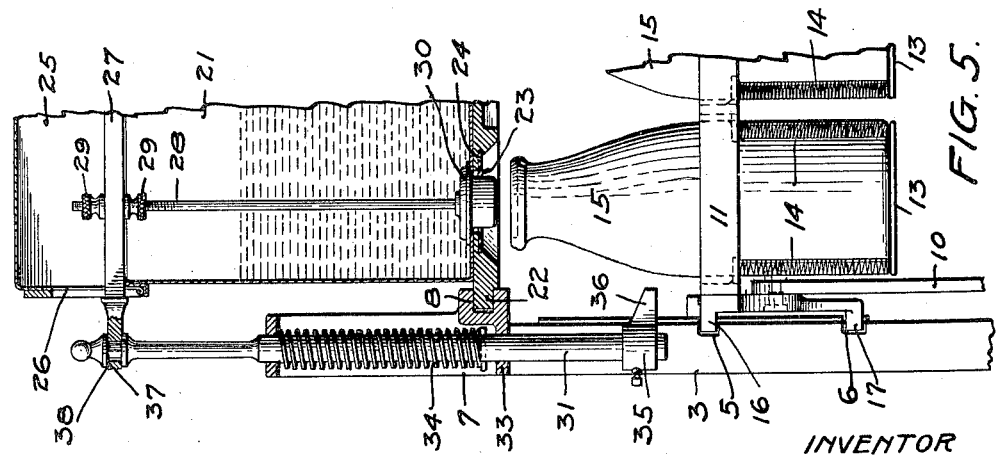
WITNESSES
INVENTOR
ERICK P. LINDAHL
BY
HIS ATTORNEYS

UNITED STATES PATENT OFFICE.

ERICK P. LINDAHL, OF MINNEAPOLIS, MINNESOTA, ASSIGNOR TO SANITARY BOTTLING DEVICE COMPANY, OF MINNEAPOLIS, MINNESOTA, A CORPORATION OF MINNESOTA.

BOTTLE-FILLER.

1,032,687.  Specification of Letters Patent.  Patented July 16, 1912.

Application filed April 25, 1911. Serial No. 623,254.

*To all whom it may concern:*

Be it known that I, ERICK P. LINDAHL, of Minneapolis, Hennepin county, Minnesota, have invented certain new and useful Improvements in Bottle-Fillers, of which the following is a specification.

The object of my invention is to provide a machine by means of which bottles may be filled with milk without allowing the milk to come in contact with the outside of the bottle or the supports therefor.

A further object is to provide a machine that is easily operated and may be easily kept in a clean, sanitary condition.

The invention consists generally in a relatively movable milk tank and bottle carrier, the tank having valves for normally closing the discharge openings with means for opening the valves when the bottles are seated in their filling position.

Further the invention consists in various constructions and combinations, all as hereinafter described and particularly pointed out in the claims.

Figure 4:
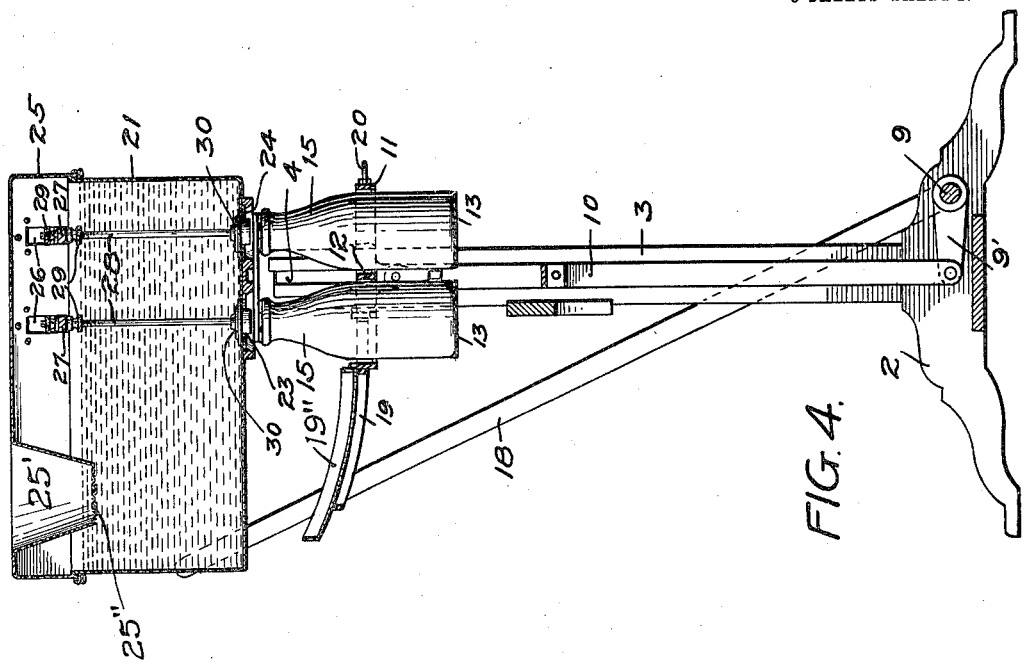
Figure 3:
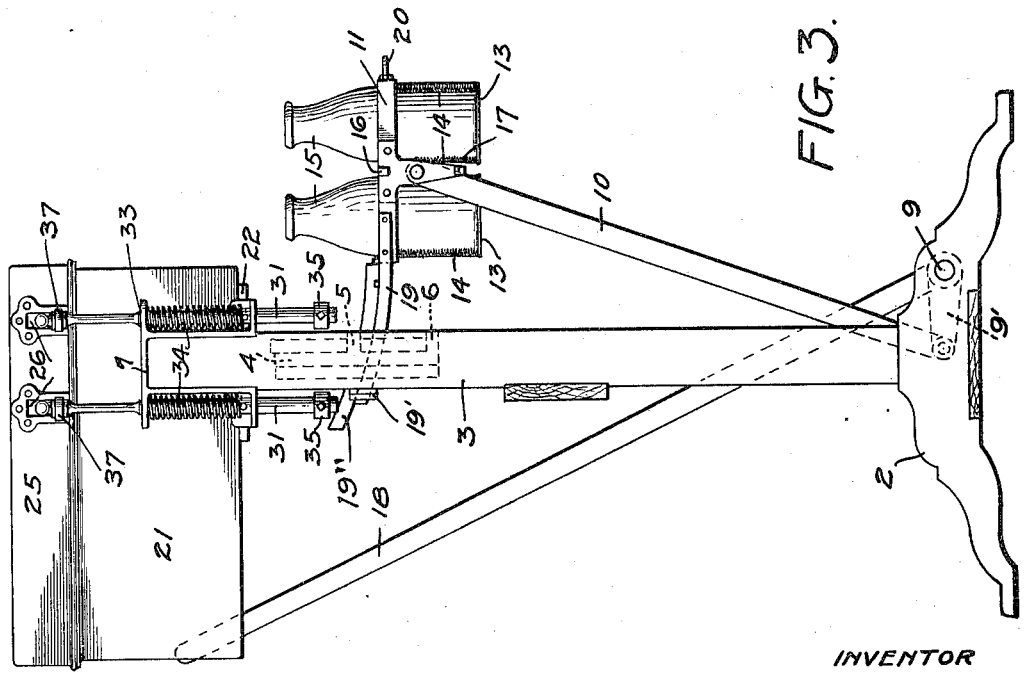

In the accompanying drawings forming part of this specification, Figure 1 is a front view of a bottle filling machine embodying my invention, Fig. 2 is a sectional view on the line x—x of Fig. 1, Fig. 3 is an end view of the machine, showing the carrier in position to receive the bottles, Fig. 4 is a similar view, showing the carrier swung to the position it assumes preparatory to the filling operation, Fig. 5 is a detail sectional view, showing the position of a bottle immediately prior to the filling operation, Fig. 6 is a similar view, showing the bottle in engagement with the bottom of the tank and forming a close, tight joint therewith, Fig. 7 is a similar view showing the valve raised and the bottle filled with milk, Fig. 8 is a detail view of a modified construction of valve stem, Fig. 9 is a detail view showing the guides for the vertically movable bottle carrier.

In the drawing, 2 represents the base of the machine, having upright standards 3. These standards have vertical guides 4 and grooves 5 and 6 communicating therewith. Upon the top of the standards castings 7 are mounted, having horizontal guides 8 thereon.

Journaled in the base 2 is a rock shaft 9 having arms 9' whereto bars 10 are pivotally connected and support a rectangular frame 11 divided by cross bars 12 into a suitable number of openings, beneath which a series of plates 13 are arranged, supported by a yielding means, such as the springs 14. Upon these plates the milk bottles 15 are placed, the frame and plates constituting the bottle carrier. On each side the frame is provided with lugs 16 and 17 which are adapted to enter the slots 5 and 6 and move vertically in the guides 4. The shaft 9 is rocked by means of a lever 18. The bars 10 are adapted to swing outwardly on their pivots to the filling position of the carrier, as shown in Fig. 3, and guides 19 are secured to the carrier and slide between the standards 3 and have projections at their outer ends which contact with the stops 19' and limit the movement of the carrier, as shown clearly in Fig. 2. I prefer also to mount a shallow pan 19'' on the guides 19 to catch the drippings from the tank in case there should be any after the carrier is swung outwardly from beneath the tank. The carrier is pivoted on the upper ends of the supporting bars and is held in a horizontal position by the guides 19. A handle 20 is preferably provided on the carrier frame for convenience in operating it. When in the position shown in Fig. 3, the empty bottles are placed in the carrier and it is then moved to the position shown in Fig. 4.

21 is a milk tank having flanges 22 that are slidable in the guides 8 so that the tank and all its connections can be readily removed from the machine for cleansing purposes. This tank has a series of ports 23 in its bottom, corresponding in number to the number of bottles to be filled and on the underside of each port I provide a gasket 24 with which the upper end of the bottle engages, forming a close, milk-tight joint around the discharge opening.

25 is a cover fitting the top of the tank and provided with vertical slots 26 in each end in which horizontally arranged bars 27 are slidable. These bars carry stems 28 adjustable by means of nuts 29 on the lower end of which valves 30 are mounted. These valves are adapted to close the ports in the bottom of the tank and shut off the flow of milk therefrom. The pressure of the valves on the seats around the ports may be regulated by the adjustment of the nuts 29. The cover is preferably provided with a spout 25' having a screen or strainer 25" in its lower end through which the milk is strained into the tank. These valves may be opened or closed by any suitable means, but I prefer to employ the mechanism which I will now describe in detail.

31 and 32 represent pairs of rods which are vertically slidable in guides 33 provided on the castings 7 and springs 34 normally hold these rods in their depressed position. The lower ends of the rods are provided with adjustable collars 35 which have lugs 36 projecting into the path of the vertically movable carrier frame and the upper ends of the rods have detachable connections with the bars 27 by means of hooks 37 engaging annular grooves 38 formed in said rods. When, therefore, the carrier is moved upwardly to bring the bottles into engagement with the bottom of the tank, the lugs 36 contacting with the carrier frame will lift the rods 31 and 32 and unseat the valves 30. This, however, will not take place until the bottles have formed a milk-tight joint with the gaskets 24. As soon as the valves are raised, the milk will flow into the bottles without contacting with the outer walls thereof and when the bottles are filled the operator, by means of the lever 18, will lower the carrier frame to separate the bottles from the tank. This separation, however, will not take place until the valves 30 have first seated themselves and shut off the flow of milk from the tank. This is due to the fact that when the bottles contact with the bottom of the tank the springs 14 will be put under tension to hold the bottles yieldingly against their seats and the preliminary downward movement of the carrier frame will not, therefore, immediately cause the disengagement of the bottles from the bottom of the tank but will effect an immediate seating of the valves 30 as soon as the carrier frame passes out of engagement with the lugs 36. When the bottles are filled with the milk, the seating of the valves will cause a portion of the milk to flow back into the tank, the amount depending, of course, upon the displacement of the lower portion of the valve. This amount will be determined by experiment, the valve preferably displacing a sufficient amount of the milk so that the disk or cap can be placed in the top of the bottle after disengagement of the bottle from the tank without spilling any of the milk.

With this apparatus milk bottles can be easily and quickly filled under perfect sanitary conditions. The milk will not come in contact with the outside of the tank or with the outside of the bottle, nor with any portion of the operating mechanism except, of course, the valves in the tank. These valves, with all the other parts of the tank, may be readily removed from the machine, as heretofore described, and thoroughly cleaned and scalded whenever necessary.

In Fig. 8 I have shown a modified construction, which consists in providing a valve stem consisting of a hollow tube 28'. This tube will allow the overflow of the liquid to ascend therein and flow into the tank.

I have shown this carrier adapted for filling six bottles, but evidently a greater or less number may be filled at one time if preferred, and instead of making the milk tank stationary and moving the bottles up to it, I may reverse the construction without departing from the spirit or scope of my invention.

I claim as my invention:—

1. A bottle filler comprising a tank having discharge ports and valves therefor, a bottle carrier having yielding supports for the bottles therein, said tank and carrier being relatively movable toward and from one another, the bottom of said tank having seats around said discharge ports to receive the tops of the bottles to be filled, means for unseating said valves, the yielding supports of said bottles allowing said valve unseating means to reseat said valves after the filling operation and before the bottles are unseated.

2. A bottle filler comprising a tank having discharge ports and valves therefor, a bottle carrier, said tank and carrier being relatively movable toward and from one another to seat the open necks of the bottles against said tank and beneath said discharge ports, said tank having seats around said discharge ports to receive the tops of the bottles, means whereby the bottles will be yieldingly held against their seats, means for unseating said valves to allow the bottles to fill, said yielding means allowing said valve unseating means to reseat said valves after the filling operation and before the bottles are unseated.

3. A bottle filler comprising a tank having discharge ports and valves therefor, a bottle carrier having means for yieldingly supporting the bottles therein, means for moving said carrier toward or from said tank, said tank having seats around said discharge openings to receive the tops of the bottles, means actuated by said carrier for unseating said valves while the bottles are seated, the yielding supports of said bottles allowing said valve unseating means to reseat said valves after the filling operation and before the bottles are unseated.

4. A bottle filler comprising a frame, a carrier mounted therein and having an oscillating movement with respect to said frame and also a vertical movement therein and means for operating said carrier, a tank mounted on said frame and having discharge ports and valves therefor and seats around said ports to receive the tops of the bottles, means for raising said carrier and moving said bottles into contact with said seats and means for unseating said valves.

5. A bottle filler comprising a frame, a tank mounted thereon and having discharge ports and valves therefor, bars extending horizontally through said tank and vertically slidable therein and connecting the stems of said valves for simultaneous operation thereof, a vertically sliding rod connected with said bars, means yieldingly holding said rod in a depressed position, a vertically sliding bottle carrier adapted to hold the bottles and move them to a filling position against said tank, and means engaged by said bottle carrier for actuating said rods to trip said valves while the bottles are seated.

6. A bottle filler comprising a suitable frame, a tank mounted thereon having discharge ports in its bottom and valves therefor, a sliding bottle carrier adapted to move the tops of the bottles into contact with the bottom of said tank, a spring actuated means for normally holding said valves in their closed position and preventing the escape of the liquid from said tank, and means adjustably connected with said spring pressed means and located in the path of said carrier, the operation of said spring pressed means being timed to unseat said valves when the bottles are seated against said tank.

7. The combination, with the upright standards, of a bottle carrier, pivoted bars whereon said bottle carrier is supported, said bars being capable of oscillation to allow said carrier to be swung to a point to receive the bottles, a tank having discharge ports and valves therefor, said carrier having a vertical movement with said bars between said standards to seat the bottles against said tank beneath said discharge ports.

8. A bottle filler comprising a frame, a filling tank mounted thereon having discharge ports and valves therefor, an oscillating carrier supported beneath said tank and also having a vertical movement in said frame to seat the bottles against said tank beneath said ports, means for unseating said valves, and a drip pan carried by said carrier and arranged to swing to a point beneath said valves when said carrier is swung outwardly to receive the bottles.

9. The combination, with the upright standards, of bars pivoted therein, a carrier pivoted on said bars, straps attached to said carrier and having shoulders or projections thereon and stops provided in the path of said projections to limit the downward movement of said carrier and bars, and a tank having discharge ports and valves therefor supported above said carrier.

10. The combination, with a frame, of a tank mounted thereon and having discharge ports and valves therefor, a rock shaft mounted in the lower portion of said frame and having arms thereon, bars pivotally connected with said arms, a lever for rocking said shaft, a bottle carrier pivoted on said arms and adapted to swing to a position beneath said tank and also having a vertical movement in said frame when said shaft is rocked, the tops of the bottles contacting with the bottom of the tank around said discharge ports and means for opening said valves to fill the bottles.

11. The combination, with a base and upright standards mounted thereon, of bars mounted in said base and adapted to swing toward and from said standards, a bottle carrier pivoted on said bars, and guides attached to said carrier and projecting between said standards and having means for limiting the oscillation of said bars.

12. The combination, with a base and upright standards mounted thereon provided with vertical guides, of a bottle carrier and pivoted supports therefor, said carrier having lugs to enter the guides in said standards, a tank having discharge ports and valves therefor supported above said carrier, and means for operating said carrier.

13. The combination, with a frame, of a tank mounted therein and having discharge ports and valves therefor, a bottle carrier, a rocking support therefor, said support allowing said carrier to be swung to a position to receive the bottles and also to a point beneath said ports, means for raising said carrier and bottles whereby the tops of the bottles contact with the tank around said ports, and means for opening said valves.

14. A bottle filler comprising a tank having discharge ports and valves therefor having their disks located within said tank, a bottle carrier, said tank and carrier being relatively movable toward and from one another, the bottom of said tank having seats around said discharge ports to receive the tops of the bottles to be filled, and means controlled by the movement of said carrier for raising said valves to open said ports while the bottles are seated, the engagement of the bottles with the seats around the discharge ports preventing the exposure of the liquid in the tank to the air.

15. A bottle filler comprising a tank having discharge ports, valves comprising disks having parts projecting through said ports, a bottle carrier, said tank and carrier being relatively movable toward and from one another, the bottom of said tank having seats around said discharge ports to receive the tops of the bottles to be filled, means for unseating said valves while the bottles are seated against the tank, and means for reseating said valves, the projecting portions thereof entering the tops of the bottles and forcing the liquid therefrom, for the purpose specified.

In witness whereof, I have hereunto set my hand this 20" day of April 1911.

ERICK P. LINDAHL.

Witnesses:
   GENEVIEVE E. SORENSEN,
   EDWARD A. PAUL.

Copies of this patent may be obtained for five cents each, by addressing the "Commissioner of Patents, Washington, D. C."